H. HORMAN.
PLOWING MACHINE.
APPLICATION FILED APR. 21, 1916.

1,212,772.

Patented Jan. 16, 1917.
2 SHEETS—SHEET 1.

Witnesses
H. B. Barlow.
A. F. Macready.

Inventor
Herman Horman

By
Howard E. Barlow
Attorney

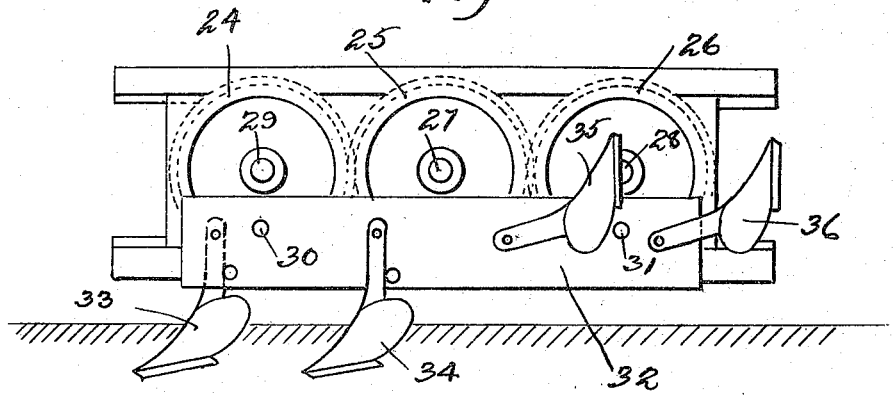
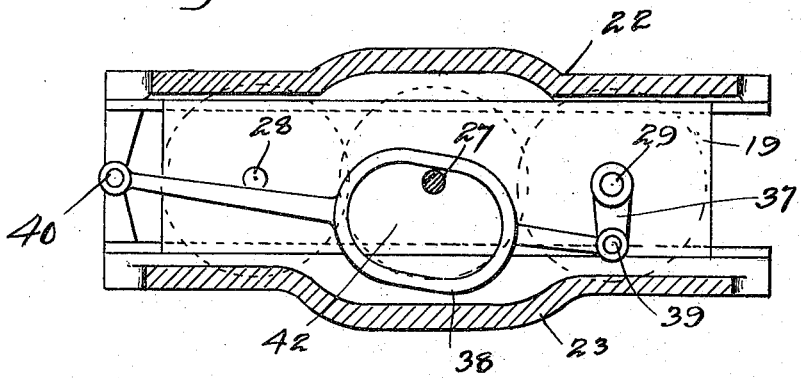
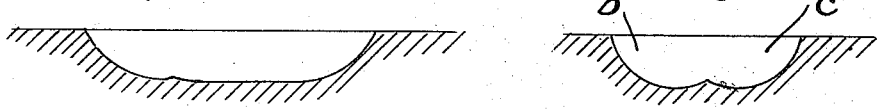
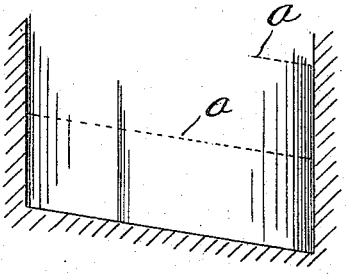

UNITED STATES PATENT OFFICE.

HERMAN HORMAN, OF ARNOLD MILLS, RHODE ISLAND.

PLOWING-MACHINE.

1,212,772.  Specification of Letters Patent.  Patented Jan. 16, 1917.

Application filed April 21, 1916. Serial No. 92,758.

*To all whom it may concern:*

Be it known that I, HERMAN HORMAN, a citizen of the United States, and resident of the town of Arnold Mills, in the county of Providence and State of Rhode Island, have invented certain new and useful Improvements in Plowing-Machines, of which the following is a specification.

This invention relates to improvements in plowing machines, and has for its object to provide a tractor carrying one or more plows, said tractor being provided with means for imparting to the plows an intermittent plowing action and to move them in a direction transversely to that of the travel of the tractor.

A further object of the invention is to impart a longitudinal movement to the plows in addition to the circular movement, to increase the length of the effective working stroke of the plow.

It is found in practice in the use of tractors for plowing purposes that in order to drag a number of plows successfully the tractor must be very heavy to provide sufficient traction to prevent the wheels from slipping. To obviate this difficulty, I have provided a plowing machine which works the plows transversely to the travel of the tractor thereby utilizing the resistance of the tractor to prevent being moved in a sidewise direction. Then again the plow has an intermittent working action, which action utilizes the inertia of the machine to the best advantage. In other words by my improved method of operating the plows intermittently and transversely to the movement of the tractor, I am enabled to successfully operate the plows by a tractor which is comparatively light in weight.

With these and other objects in view, the invention consists of certain novel features of construction, as will be more fully described, and particularly pointed out in the appended claims.

Figure 1:
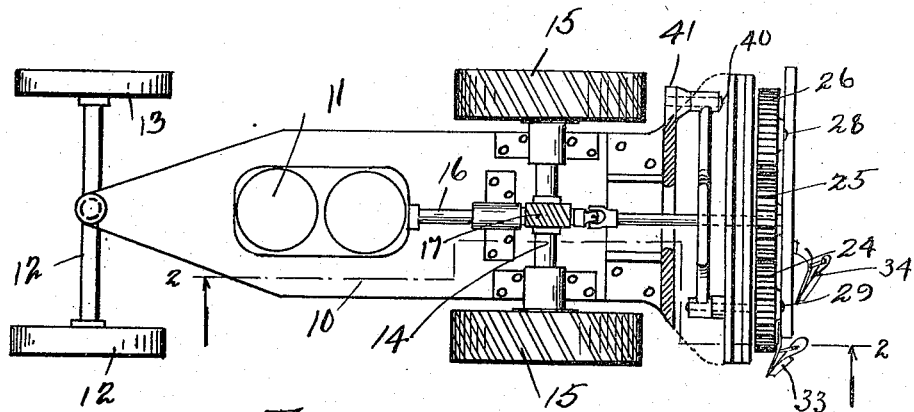
Figure 2:
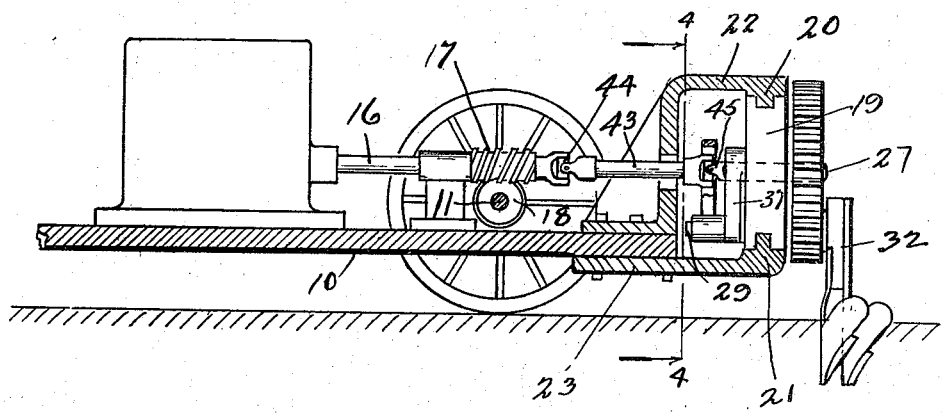

In the accompanying drawings: Figure 1—is a plan view with the guide frame partly in section to better show the mechanism. Fig. 2—is an elevation sectioned on line 2—2 of Fig. 1. Fig. 3—is a rear end view of the apparatus showing the mechanism by which the plowing action is obtained. Fig. 4—is a section on line 4—4 of Fig. 2 looking in the direction of the arrows. Fig. 5—is a sectional elevation showing the shape of the cut the two plows would make if operated simply by the circular motion imparted by my machine. Fig. 6—shows the shape of the cut made by two plows when operated by both the circular and the longitudinal motion. Fig. 7—is a plan view showing the diagonal form of cut which is due to the transverse movement of the plows during the advancing motion of the tractor.

Referring to the drawings 10 designates the frame of the tractor on which is mounted the motor 11, this frame being supported on the forward axle 12 mounted on the steering wheels 13 and the rear axle 14 mounted on the driving wheels 15. The motor is provided with the usual driving shaft 16 which rotates the driving wheels 15 through the worm 17 and worm gear 18, the motor shaft then extending rearwardly to drive the plow operating mechanism hereinafter described.

A plate 19 is slidably mounted on the ways 20 and 21, the upper way being supported by a housing 22 bolted to the frame 10 and the lower way 21 is supported by the plate 23 also bolted to the frame 10. On this plate 19 is mounted three gears 24, 25 and 26, the middle gear 25 being mounted on the end of driving shaft 27 while gears 24 and 26 are mounted on short shafts 28 and 29, respectively. Gears 24 and 26, respectively, are provided with pins 30 and 31 projecting from their faces and offset from the center thereby serving as eccentrics or crank pins. A bar or beam 32 is connected to both of these pins, whereby the rotating of these gears impart to this bar a circular action. This bar thus mounted serves as a carrier for the plows any desired number of which may be mounted thereon. In Fig. 3, I have shown two plows 33 and 34 mounted on this carrier bar facing in one direction, and two plows 35 and 36 facing in the opposite direction but withdrawn from action, they, however, are pivotedly hung and so are arranged to be dropped down into operative position when called upon to act in a direction opposite to that of plows 33 and 34.

Another feature of my invention is that these gears with their plows and operating mechanism are all mounted on the sliding plate 19, which plate receives a longitudinal motion through the medium of the connecting rod 38, one end of which is connected to the crank pin 39 of the crank 37 and the opposite end to the stationary pin 40 in the wall 41 of the frame 22. This connecting rod is provided with a central opening at 42 so as to straddle the driving shaft 27. All this plate operating mechanism is driven from the main shaft 43 through the short shafts 16 and 27 and the knuckle joints 44 and 45, which joints permit the longitudinal lateral movement of the plate 19 during the driving action, the shaft 43 being telescoping or extendible to permit the lateral movement of the slidable plate 19.

I have shown the plowing mechanism as driven direct from the main shaft 16 but in many cases the speed of this portion of the shaft will be materially reduced by the interposition of the usual power transmission gearing (not herein shown).

In the operation of my improved plowing machine, in some instances the plate 19 which supports the gears and the plow carrying bar 32, may be fixed, then when these gears are driven through the shaft 27, the bar 32, which is journaled on the two crank pins 30 and 31 in these gears serves to move the plows in a circular direction and transversely to the travel of the tractor. The plows employed for my particular operation are preferably of the so-called auger twist type and are set on an angle directed slightly forward as illustrated in Fig. 1, whereby they will naturally take the combined lateral motion due to the crank action, and the forward motion due to the movement of the tractor and this without dragging, forming a diagonal cut as illustrated by dotted lines $a$ in Fig. 7. When the plows are operated by this circular motion, the furrow formed will be similar to that illustrated in Fig. 5, $b$ indicates the cut of plow 33 and $c$ indicates the cut of plow 34, the width of the cut corresponding to twice the offset or throw of the crank.

In some instances it is found desirable to make the furrow wider than would naturally be made by the swinging of the cranks alone, therefore, to accomplish this, I have mounted this plate 19 to slide longitudinally in the pair of ways, this result being accomplished by providing another crank as illustrated at 37 in Fig. 4 and connecting the same by the rod 38 to a fixed pin 40 in the frame whereby the rotation of the gear 24 by its driver 25, causes the plows to reciprocate and impart to them a longitudinal motion as well as a circular movement, by the use of which mechanism the plow is carried forward a distance twice the length of the crank 37, thereby making a cut in the form illustrated in Fig. 6.

After making each cut the plow is returned, the width of the cut representing the travel of the machine during both the plowing and the return operation of the plow so that the soil from each furrow will be turned over into the next preceding furrow.

By my improved method of operating the plows transversely to the travel of the tractor, I obtain the maximum effect of the ways resistance of the tractor to the action of the plows, and also by an intermittent action of the plows I am enabled to utilize to the best advantage the inertia of the tractor permitting it to gain its speed and momentum during the intervals that the plows are returning for another operating stroke.

Having thus described one illustrative embodiment of my invention I desire it to be understood that any means for operating one or more plows in a direction transverse to the movement of the tractor in the manner claimed will fall within the spirit and scope of my invention.

I claim:

1. In a plowing machine, a tractor, a plow carrying member, one or more plows mounted on said member, means for moving said member in a circular path, a slidable member in which said circularly movable member is mounted and means for imparting to said latter member a reciprocatory motion.

2. In a plowing machine, a tractor, a plow carrying member, one or more plows mounted on said member, means including a set of gears for moving said member in a circular path, a slidable member in which said circular movable member is mounted and means for imparting to said latter member a reciprocatory motion.

3. In a plowing machine, a tractor, a plow carrying member, one or more plows mounted on said member, means including a set of gears for imparting a circular movement to said member, a slidable member carrying said plow carrying member, and means for reciprocating said sliding member in a direction transverse to the movement of said tractor.

4. In a plowing machine, a tractor, a plow carrying member, one or more plows mounted on said member, means including a set of gears for imparting a circular movement to said member, a slidable member carrying said plow carrying member, a crank rotated by one of said gears and a rod connected to said crank for causing said sliding member to reciprocate in a direction transverse to the movement of said tractor.

5. In a plowing machine, a tractor, a frame on the rear of said tractor, a plate mounted to slide transversely in said frame relative to the movement of the tractor, a set of gears carried by said plate, a plow supported by said gears, means for reciprocating said plate, and means for rotating said gears thereby imparting to said plows a combined longitudinal and circular motion.

In testimony whereof I affix my signature.

HERMAN HORMAN.

Copies of this patent may be obtained for five cents each, by addressing the "Commissioner of Patents, Washington, D. C."